United States Patent [19]

Boux

[11] 3,997,788
[45] Dec. 14, 1976

[54] DEVICE FOR MONITORING THE POSITION, INTENSITY, UNIFORMITY AND DIRECTIVITY OF AN IONIZING RADIATION BEAM

[75] Inventor: René Boux, Paris, France

[73] Assignee: C.G.R.-Mev., Paris, France

[22] Filed: June 10, 1975

[21] Appl. No.: 585,506

[30] Foreign Application Priority Data
June 14, 1974 France .............................. 74.20719

[52] U.S. Cl. ................................................ 250/385
[51] Int. Cl.² ........................................... G01T 1/18
[58] Field of Search ........................... 250/385, 374

[56] References Cited
UNITED STATES PATENTS

| 3,612,858 | 10/1971 | De Parry | 250/385 X |
| 3,703,638 | 11/1972 | Allemand et al. | 250/385 |
| 3,808,441 | 4/1974 | Boux | 250/385 X |
| 3,852,610 | 12/1974 | McIntyre | 250/385 |

Primary Examiner—Davis L. Willis
Attorney, Agent, or Firm—Karl F. Ross; Herbert Dubno

[57] ABSTRACT

An ionization chamber is peripherally bounded by a stack of four coaxial annular frames with rabbeted confronting faces forming three annular recesses on the peripheral chamber wall, the middle recess receiving a transverse partition whereas the other two recesses form seats for peripheral zones of two dielectric disks with discontinuous metallic coatings constituting mutually insulated segmental electrode elements. The segmental elements terminate short of the peripheral chamber wall, except for a tab extending from each element onto the peripheral disk zone received in the corresponding recess within which that tab is connected to an external lead. The tabs of the two disks are angularly offset from one another, as are the segmental boundaries of their conductive elements.

11 Claims, 4 Drawing Figures

DEVICE FOR MONITORING THE POSITION, INTENSITY, UNIFORMITY AND DIRECTIVITY OF AN IONIZING RADIATION BEAM

CROSS-REFERENCE TO RELATED APPLICATIONS

This application contains subject matter disclosed in my copending application Ser. No. 434,912 filed 21 Jan. 1974, now U.S. Pat. No. 3,942,012, and in my prior application Ser. No. 243,208, filed 30 April 1974 and now U.S. Pat. No. 3,808,441.

FIELD OF THE INVENTION

The present invention relates to an improvement in a device for monitoring the position, intensity, uniformity and directivity of an ionizing beam of charged or uncharged particles and relates more especially to the structure of the ion-collecting electrodes arranged in the ionization chamber.

BACKGROUND OF THE INVENTION

In my above-identified applications and patents I have disclosed and claimed a beam-monitoring device with a radiation-transparent housing divided by an internal partition into two compartments, each compartment including a disk-shaped electrode transverse to the housing axis. Each electrode comprises a plurality of mutually insulated conductive elements designed to intercept different portions of a generally axially incident beam, the elements of one electrode being angularly offset from those of the other electrode.

OBJECT OF THE INVENTION

The object of my present invention is to provide an improved mounting for an electrode, or pair of electrodes, in an ionization chamber of a device of this type.

SUMMARY OF THE INVENTION

I realize this object, in accordance with the present invention, by forming the ionization chamber from a stack of annular frames centers on a common axis, these frames being provided with rabbeted confronting faces which form one or more annular recesses on an inner wall surface of the chamber. One such recess, specifically the middle one of three, may be used to seat a partition dividing the chamber into two electrode compartments; each compartment then includes a disk-shaped electrode of the general character described above, a peripheral zone of each disk being received in another such recess.

According to a more particular feature of my invention, the disks consist of a dielectric material such as polyethylene terephthalate and are provided, on opposite surfaces, with discontinuous metallic coatings forming the conductive elements thereof. These coatings terminate short of the inner wall surface of the ionization chamber, except for a tab extending from each element onto the peripheral zone of the respective disk so as to come to lie in the annular recess in which the disk is seated; within this recess the tab is connected to an output lead forming part of an ionization-detecting circuit.

BRIEF DESCRIPTION OF THE DRAWING

The above and other features of my invention will now be described in detail with reference to the accompanying drawing in which.

SPECIFIC DESCRIPTION

Figure 1:
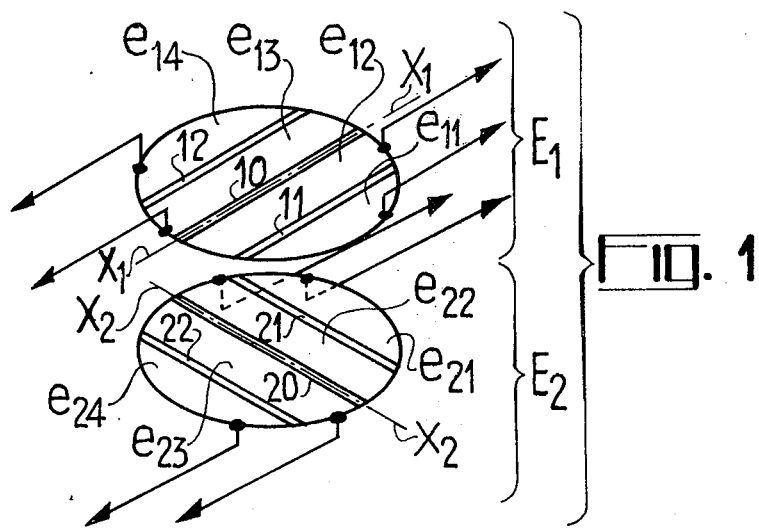
FIG. 1 is an isometric view schematically illustrating a pair of disk-shaped electrodes forming part of a radiation-monitoring device according to my invention.
Figure 2:
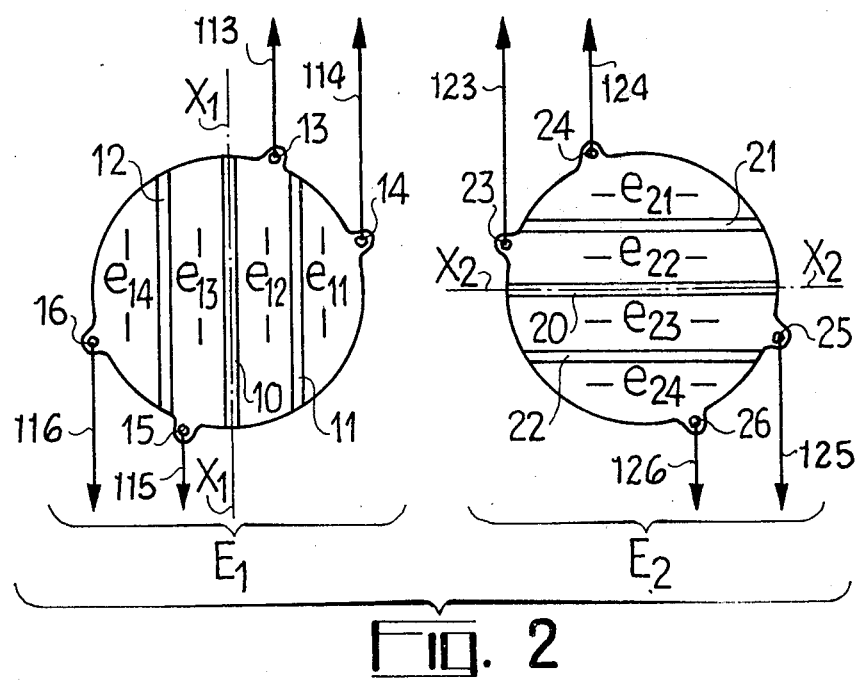
FIG. 2 is a schematic plan view showing the electrodes of FIG. 1 side by side.

In the embodiment of the invention illustrated in FIG. 1, two disk-shaped electrodes $E_1$ and $E_2$ are respectively split into four lamellar elements or segments $e_{11}, e_{12}, e_{13}, e_{14}$ and $e_{21}, e_{22}, e_{23}, e_{24}$. The elements $e_{11}, e_{12}, e_{13}, e_{14}$ are disposed symmetrically on opposite sides of an axis $X_1—X_1$ which splits the electrode $E_1$ into two equal parts, and the elements $e_{21}, e_{22}, e_{23}, e_{24}$ are disposed symmetrically on opposite sides of an axis $X_2—X_2$ splitting the electrode $E_2$ into two equal parts. The lamellar elements $e_{11} \ldots e_{14}$ are separated from one another by insulating bands 10, 11, 12; elements $e_{21} \ldots e_{24}$ are similarly separated by insulating bands 20, 21, 22 disposed at right angles to bands 10, 11, 12. The segments $e_{11} \ldots e_{14}$ and $e_{21} \ldots e_{24}$ are equipped with respective output connections including tabs 13, 14, 15, 16, with leads 113, 114, 115, 116 and tabs 23, 24, 25, 26 with leads 123, 124, 125, 126. FIG. 2 illustrates a particularly advantageous relative arrangement of the tabs 13 to 16 and 23 to 26, at angularly offset locations.

Figure 3:
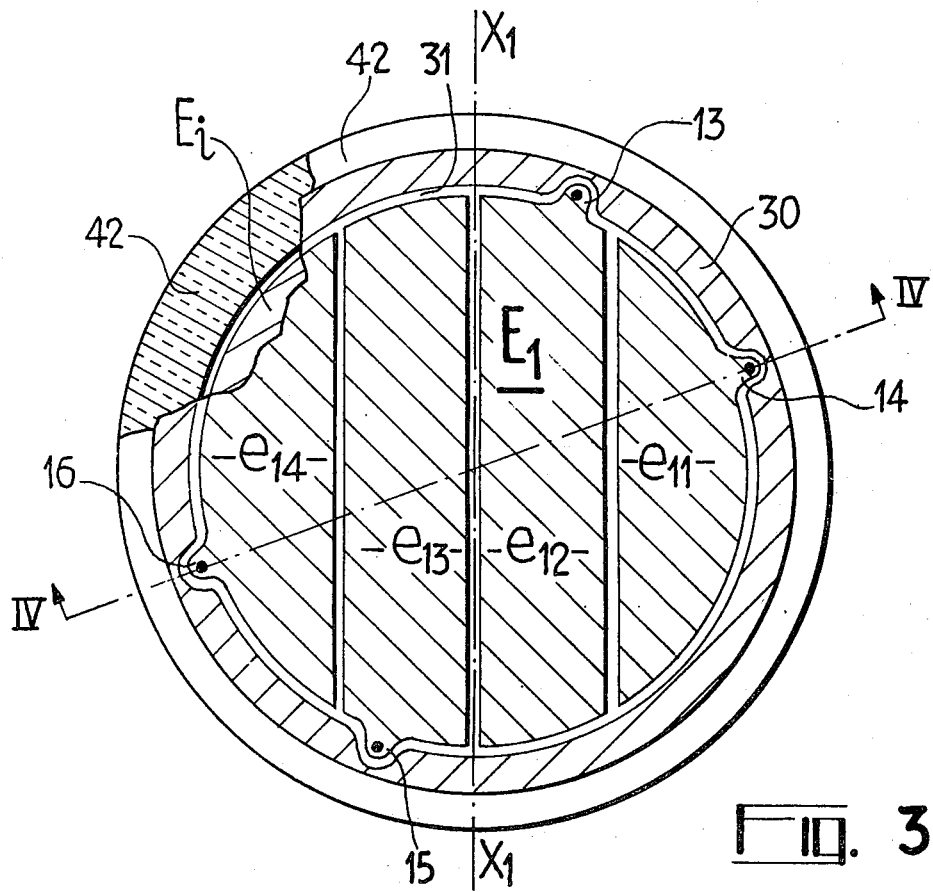
FIG. 3 is a plan view, drawn to a larger scale, of one of the electrodes of FIGS. 1 and 2 mounted in an ionization chamber, the assembly being shown partly in section on the line III—III of FIG. 4.

FIG. 3 illustrates in more detailed fashion the electrode $E_1$, on a larger scale. The segments $e_{11} - e_{14}$ of this circular electrode have identical areas and are surrounded by a metallised ring zone 30 which is electrically insulated from them by a nonmetallized ring zone 31. Electrode $E_1$ can be produced by metallizing both faces of a polyethylene terephthalate foil, the latter being carried by a frame 42 of annular form made of polymethylacrylate (Trade-Mark PLEXIGLASS), for example.

Figure 4:
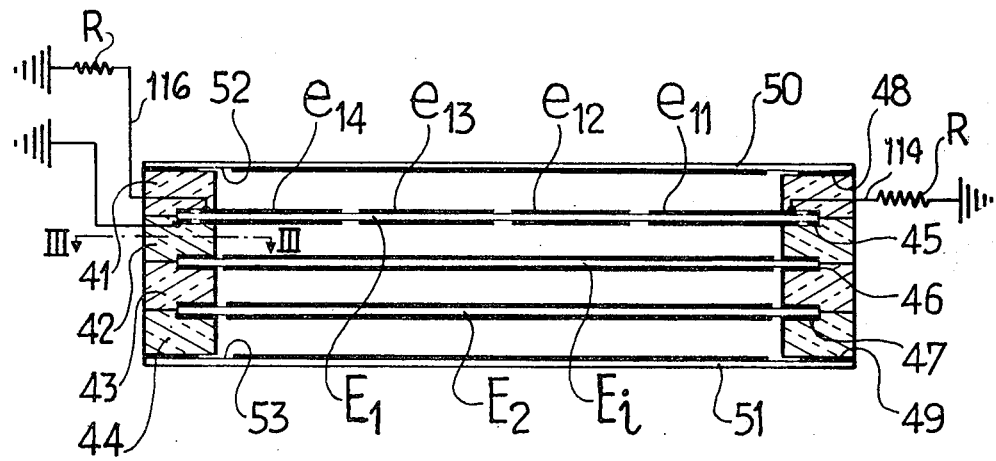
FIG. 4 is a cross-sectional view taken on the line IV—IV of FIG. 3.

FIG. 4 illustrates an embodiment of an ionization chamber according to my invention comprising two monitoring electrodes $E_1$ and $E_2$ separated by an intermediate metallized membrane $E_i$. Annular frames 41, 42, 43, 44 are coaxially stacked and the electrode $E_1$, the metallized membrane $E_i$ and the electrode $E_2$ are respectively situated in annular recesses 45, 46, 47 which are formed by the rabbeted frames 41 to 44 and insure the correct positioning of these electrodes $E_1$, $E_2$ and the intervening partition $E_i$. The leads 113–116 of the electrode $E_1$ and the leads 123–126 of the electrode $E_2$ as well as an output lead of membrane $E_i$ pass radially through the frames 41, 44 and 42, respectively, leaving them laterally. Only the output leads 114 and 116 of the electrode $E_1$ are visible in FIG. 4.

On the external faces 48 and 49 of the frames 41 and 44 there are respectively attached two membranes 50 and 51 of polyethylene terephthalate metallized on their internal surfaces. These two membranes 50 and 51 and the metallized membrane $E_i$ are maintained at a positive potential of a few hundred volts, for example, in relation to the electrodes $E_1$ and $E_2$, the latter themselves being grounded through resistors R inserted in their output leads. In order to insure satisfactory electrical insulation between the leads 113–116 and 123–126 in their areas of attachment to the tabs 13–16 and 23–26, the membranes 50 and 51 respectively exhibit annular zones 52, 53 carrying no metallization, the mean diameter of these zones being substantially equal to the diameter of the circle along which there are disposed the points of attachment of the leads 113–116 and 123–126 to the tabs 13–16 and 23–26.

In operation, the monitoring device in accordance with the invention makes it possible to ascertain the centering of an ionizing radiation beam passing through the ionization chamber, the diameter of the beam being substantially equal to the diameter of the electrodes $E_1$ and $E_2$, by comparing the ion currents $i_{11} \ldots i_{14}$ and $i_{21} \ldots i_{24}$ of the electrodes $e_{11} \ldots e_{14}$ and $e_{21} \ldots e_{24}$ in the following fashion:

assuming that the areas $e_{11} \ldots e_{14}$ are mutually equal, and that the areas $e_{21} \ldots e_{24}$, are also mutually equal, the centering of the beam can be said to be satisfactory if:

$$i_{11} + i_{12} = i_{13} + i_{14} \tag{1}$$

and $$i_{21} + i_{22} = i_{23} + i_{24} \tag{2}$$

If the equations (1) and (2) are not satisfied, a corrective or safety system controlled by processing circuits associated with each of the electrodes $E_1$, $E_2$ makes it possible to reposition or stop the beam.

On the other hand, the uniformity of the beam will be satisfactory if the following conditions are met:

$$i_{12} + i_{13} = k\,(i_{11} + i_{14}) \tag{3}$$

and $$i_{22} + i_{23} = k\,(i_{21} + i_{24}) \tag{4}$$

$k$ being a coefficient equal to the ratio of the areas of the elements $e_{11}$ and $e_{12}$ as well as $e_{14}$ and $e_{13}$ for the first electrode $E_1$, and to the ratio of the areas of the elements $e_{21}$ and $e_{22}$ as well as $e_{24}$ and $e_{23}$ in the case of the second electrode $E_2$.

A system for correcting the uniformity of the beam can be controlled by circuits for processing the electrical signals developed across the output resistors R of the electrodes $E_1$ and $E_2$. Such circuits, not shown here, have been disclosed in my prior U.S. Pat. Nos. 3,808,441 and 3,942,012.

The intensity of the radiation beam corresponds to the sum of the currents $i_{11} \ldots i_{14}$ or $i_{21} \ldots i_{24}$ measured respectively at each of the electrodes $E_1$ and $E_2$. Equality between the currents emitted by the electrodes $E_1$ and $E_2$ corresponds to proper operation of the monitoring device.

A monitoring device of this kind, in accordance with the inventon, has several advantages in relation to prior devices of this type, namely:

— ease of attachment of the output connections leads to the various elements of the electrodes $E_1$ and $E_2$;

— convenience of the peripheral arrangement of the output leads which are connected to the tabs 13–16 and 23–26 within the annular recesses 45–47 formed by the nonconductive frames 41–44, these tabs being disposed in pairs at diametrically opposite locations as shown in FIG. 2;

the ability to determine with great accuracy the centering and uniformity even of a beam having a diameter very much smaller than the diameter of the monitoring electrodes; and the simplification of the processing circuits and of the measurements which have to be carried out in order to monitor the centering and uniformity of the beam, in the case where the elements of the electrodes $E_1$ and $E_2$ are chosen in such a fashion that they have equal areas ($k = 1$). For electrodes of radius $r$, the width L of the elements $e_{12}$ and $e_{13}$ as well as of the elements $e_{22}$ and $e_{23}$ is in this case substantially given by $L \approx 0.4r$.

What I claim is:

1. A device for monitoring the position, intensity, uniformity and directivity of a beam of ionizing radiation, comprising:

a stack of annular frames centered on an axis and forming an ionization chamber, said frames being provided with rabbeted confronting faces forming at least one annular recess on an inner wall surface of said chamber;

a pair of membranes of nonconductive material spanning said stack at opposite ends of said chamber; and electrode means in said chamber connected in a circuit for detecting ionizing radiation, said electrode means including at least one disk transverse to said axis provided with a peripheral zone received in said annular recess, said disk being provided with a plurality of mutually insulated conductive elements intercepting different portions of a generally axially incident beam.

2. A device as defined in claim 1 wherein said stack includes four of said frames with rabbeted confronting faces forming three annular recesses therebetween, further comprising a conductive transverse partition seated in the middle one of said three recesses and dividing said chamber into two compartments, said electrode means including a pair of substantially identical disks seated in the other two of said recesses on opposite sides of said partition, the conductive elements of one of said disks being angularly offset from the conductive elements of the other of said disks.

3. A device as defined in claim 2 wherein the conductive elements of each of said disks are a symmetrical array of 2n segments, n being an integer greater than 1.

4. A device as defined in claim 3 wherein the segments of one of said disks have boundaries extending at right angles to the boundaries of the segments of the other of said disks.

5. A device as defined in claim 2 wherein said disks consist of a dielectric material and are provided with discontinuous metallic coatings forming said conductive elements.

6. A device as defined in claim 5 wherein said partition consists of a further disk of dielectric material with metallized opposite surfaces.

7. A device as defined in claim 5 wherein said dielectric material is polyethylene terephthalate.

8. A device as defined in claim 5 wherein said metallic coatings terminate short of said inner wall surface except for a tab extending from each of said conductive elements onto the peripheral zone of the respective disk, said circuit including leads connected to said tabs at points within said recesses.

9. A device as defined in claim 8 wherein the tabs of one of said disks are angularly offset from the tabs of the other of said disks.

10. A device as defined in claim 8 wherein said coatings form four segmental elements on each disk surface, the tabs of said segmental elements being disposed in pairs at diametrically opposite locations.

11. A device as defined in claim 10 wherein the pairs of tabs of one of said disks are angularly offset from the pairs of tabs of the other of said disks.

\* \* \* \* \*